US012717256B2

(12) United States Patent
Ishihara et al.

(10) Patent No.: US 12,717,256 B2
(45) Date of Patent: Aug. 25, 2026

(54) FIXING DEVICE AND IMAGE FORMING APPARATUS

(71) Applicant: FUJIFILM Business Innovation Corp., Tokyo (JP)

(72) Inventors: Takuma Ishihara, Kanagawa (JP); Takashi Matsubara, Kanagawa (JP); Takashi Ohashi, Kanagawa (JP); Hina Saito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/178,081

(22) Filed: Mar. 3, 2023

(65) Prior Publication Data

US 2024/0103413 A1 Mar. 28, 2024

(30) Foreign Application Priority Data

Sep. 27, 2022 (JP) ................................ 2022-154043

(51) Int. Cl.
*G03G 15/20* (2006.01)

(52) U.S. Cl.
CPC ..... *G03G 15/2032* (2013.01); *G03G 15/2053* (2013.01); *G03G 15/2064* (2013.01); *G03G 2215/2003* (2013.01); *G03G 2215/2035* (2013.01); *G03G 2215/2038* (2013.01)

(58) Field of Classification Search
CPC ........... G03G 15/2032; G03G 15/2053; G03G 15/2064; G03G 2215/2003; G03G 2215/2035; G03G 2215/2038
See application file for complete search history.

(56) References Cited

U.S. PATENT DOCUMENTS

2009/0297233 A1* 12/2009 Kameda ............. G03G 15/2028 399/322
2013/0164054 A1* 6/2013 Hayashi ............. G03G 15/2053 399/329
2015/0063846 A1* 3/2015 Fukai ................. G03G 15/5029 399/68
2015/0212465 A1* 7/2015 Momma ............ G03G 15/2025 399/67

(Continued)

FOREIGN PATENT DOCUMENTS

JP 2007199596 A * 8/2007
JP 4594125 B2 * 12/2010 ........... G03G 15/205

(Continued)

OTHER PUBLICATIONS

JP-2020086269-A, English Translation (Year: 2020).*

(Continued)

*Primary Examiner* — Ryan D Walsh
(74) *Attorney, Agent, or Firm* — Sughrue Mion, PLLC

(57) ABSTRACT

A fixing device includes an endless belt, a fixing member that presses the belt against a recording medium holding an unfixed image to fix the unfixed image onto the recording medium, a restorer that is pressed against a surface of the belt after the image is fixed to restore the surface of the belt to a state before a fixing operation, and a changer that changes a pressing load of the restorer in accordance with a difference in a state of the surface of the belt between before the fixing operation and after the fixing operation.

3 Claims, 11 Drawing Sheets

(56) References Cited

U.S. PATENT DOCUMENTS

| | | | | |
|---|---|---|---|---|
| 2015/0323892 | A1* | 11/2015 | Sakamaki | G03G 15/2017 399/327 |
| 2016/0033914 | A1* | 2/2016 | Momma | H10F 39/806 250/206 |
| 2016/0170342 | A1* | 6/2016 | Yoshimura | G03G 15/2032 399/327 |
| 2017/0090368 | A1* | 3/2017 | Ujiie | G03G 15/2053 |
| 2018/0059598 | A1* | 3/2018 | Hasegawa | G03G 15/2028 |
| 2021/0141322 | A1* | 5/2021 | Tatezawa | G03G 15/2053 |
| 2022/0137539 | A1* | 5/2022 | Yamamura | G03G 15/5029 399/328 |

FOREIGN PATENT DOCUMENTS

| | | | | |
|---|---|---|---|---|
| JP | 5825938 B2 | * | 12/2015 | G03G 15/2025 |
| JP | 5939867 B2 | * | 6/2016 | G03G 15/2064 |
| JP | 2017-107019 A | | 6/2017 | |
| JP | 2020-086349 A | | 6/2020 | |
| JP | 2020086269 A | * | 6/2020 | G03G 15/2025 |
| KR | 20140117209 A | * | 10/2014 | G03G 15/2053 |

OTHER PUBLICATIONS

KR-20140117209-A, English Translation (Year: 2014).*
JP-2007199596-A, English Translation (Year: 2007).*
JP-5825938-B2, English Translation (Year: 2015).*
JP-4594125-B2, English Translation (Year: 2010).*
JP-5939867-B2, English Translation (Year: 2016).*

* cited by examiner

| | | SHEET BASIS WEIGHT | | |
|---|---|---|---|---|
| | | – 82 gsm | 82 – 200 gsm | 200 gsm – |
| THRUST AMOUNT | LOW | ✓ | | |
| | INTERMEDIATE | | ✓ | |
| | HIGH | | | ✓ |

| | | |
|---|---|---|
| BELT SURFACE GLOSS DIFFERENCE (LOCATED AT POSITION OTHER THAN SIDE/AT SIDE POSITION) 60°GLOSS | LOW (– 3) | THRUST AMOUNT: LOW |
| | INTERMEDIATE (3 – 9) | THRUST AMOUNT: INTERMEDIATE |
| | HIGH (9 –) | THRUST AMOUNT: HIGH |

| | | LOAD AT FIXING NIP | | |
|---|---|---|---|---|
| | | SMALL | INTERMEDIATE | LARGE |
| THRUST AMOUNT | LOW | ✓ | | |
| | INTERMEDIATE | | ✓ | |
| | HIGH | | | ✓ |

FIXING DEVICE AND IMAGE FORMING APPARATUS

CROSS-REFERENCE TO RELATED APPLICATIONS

This application is based on and claims priority under 35 USC 119 from Japanese Patent Application No. 2022-154043 filed Sep. 27, 2022.

BACKGROUND

(i) Technical Field

The present disclosure relates to a fixing device and an image forming apparatus.

(ii) Related Art

For example, Japanese Unexamined Patent Application Publication No. 2017-107019 and Japanese Unexamined Patent Application Publication No. 2020-086349 have described the technology relating to a fixing device.

Japanese Unexamined Patent Application Publication No. 2017-107019 describes a fixing device that includes a contact member that is in contact with a fixing belt while having its contact surface, in contact with an outer circumferential surface of a retainer, extending in a longitudinal direction of the outer circumferential surface.

Japanese Unexamined Patent Application Publication No. 2020-086349 describes a fixing device that includes a sliding member that comes into contact with a surface of a fixing member to slide over the surface, and a controller that controls sliding time of the sliding member based on a total count of passed recording media from a predetermined timing. The controller determines the sliding time based on a sliding-time-calculation count of passed sheets calculated based on the total count of passed sheets. The sliding-time-calculation count of passed sheets is calculated with the sum total of the values each acquired by multiplying the count of the passed sheets by each of adjustment coefficients that vary around a threshold preset for the total count of passed sheets. The controller varies the contact pressure on the fixing member in a sliding member around the threshold.

SUMMARY

Aspects of non-limiting embodiments of the present disclosure relate to a device that retains the life of a belt, and reduces damages on a surface of the belt after a fixing operation further than a device that does not include a changing member that changes a pressing load of a restorer in accordance with a difference in the state of the surface of the belt between before a fixing operation and after the fixing operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing device comprising an endless belt, a fixing member that presses the belt against a recording medium holding an unfixed image to fix the unfixed image onto the recording medium, a restorer that is pressed against a surface of the belt after the image is fixed to restore the surface of the belt to a state before a fixing operation, and a changer that changes a pressing load of the restorer in accordance with a difference in a state of the surface of the belt between before the fixing operation and after the fixing operation.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment

Figure 1:
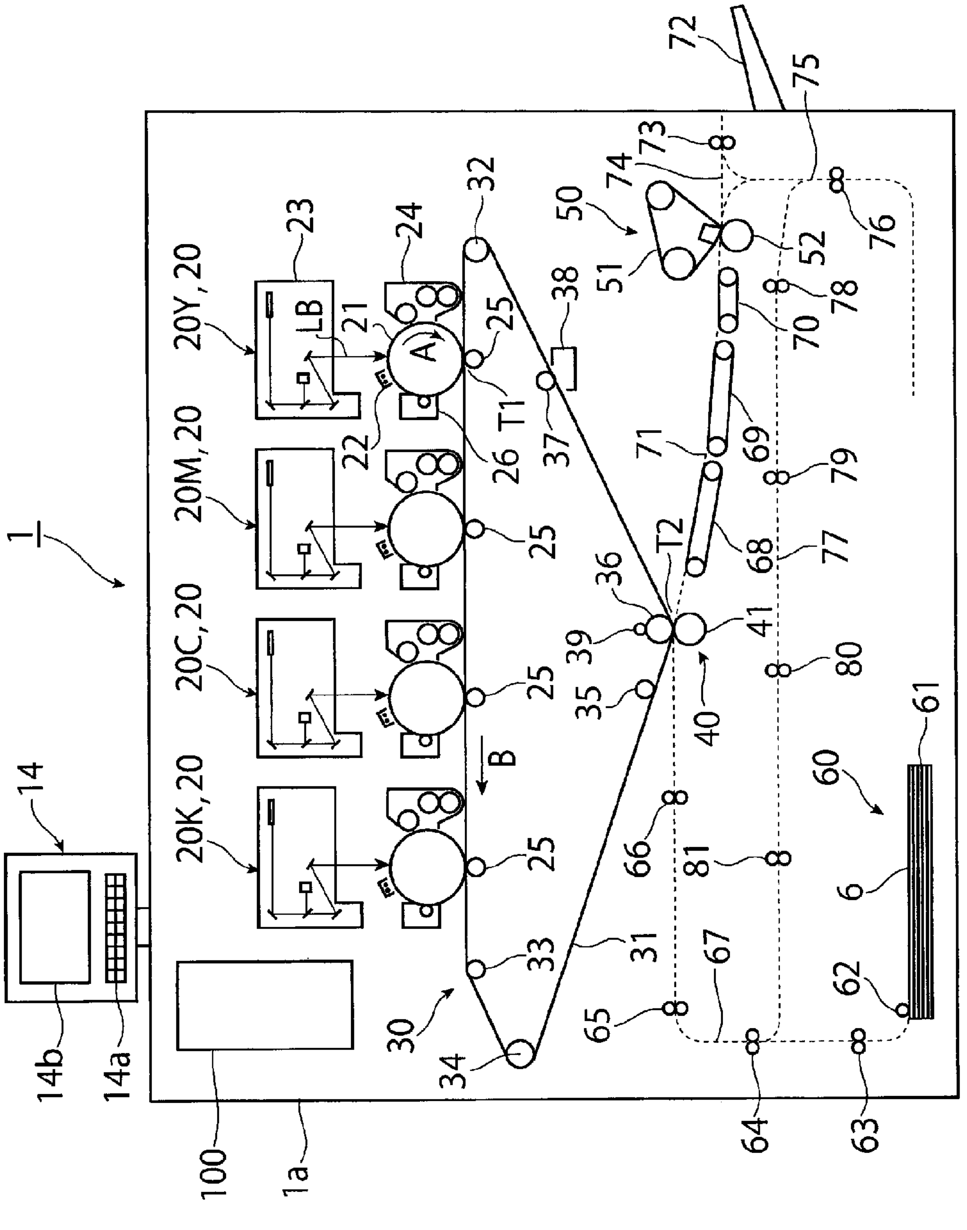
FIG. 1 is a diagram of the entire structure of an image forming apparatus to which a fixing device according to a first exemplary embodiment of the present disclosure is applied.

FIG. 1 is a diagram of the entire structure of an image forming apparatus including a fixing device according to a first exemplary embodiment of the present disclosure.

Entire Structure of Image Forming Apparatus

An image forming apparatus 1 according to a first exemplary embodiment is formed as, for example, a color printer. As illustrated in FIG. 1, the image forming apparatus 1 includes components including multiple image forming devices 20 that form toner images developed with toner serving as a developer, an intermediate transfer device 30 that holds the toner images formed by the image forming devices 20 and finally transports the toner images to a second transfer position where the toner images are second-transferred to recording sheets 6 serving as an example of recording media, a sheet feeding device 60 that accommodates and transports the predetermined recording sheets 6 to be fed to the second transfer position of the intermediate transfer device 30, and a fixing device 50 serving as an example of a fixing unit that fixes the toner image on each recording sheet 6 second-transferred by the intermediate transfer device 30 onto the recording sheet 6. An apparatus body 1*a* includes, for example, a support structure member and an outer cover.

In the first exemplary embodiment, the multiple image forming devices 20 and the intermediate transfer device 30 constitute an image forming unit that forms toner images on the recording sheets 6. Alternatively, the image forming unit may naturally include a single image forming device that directly forms a toner image on a recording medium without using the intermediate transfer device.

As illustrated in FIG. 1, the image forming apparatus 1 includes the four image forming devices 20 arranged in a line in the horizontal direction in the internal space of the apparatus body 1*a*. The four image forming devices 20 are image forming devices 20Y, 20M, 20C, and 20K that dedicatedly form color toner images corresponding to respective colors of yellow (Y), magenta (M), cyan (C), and black (K).

The image forming devices 20 (20Y, 20M, 20C, and 20K) basically have the same structure. Each of the image forming devices 20 (20Y, 20M, 20C, and 20K) includes components including a photoconductor drum 21 serving as an example of an image carrier that rotates in a direction indicated with arrow A, a charging device 22 that electrically charges, with a predetermined potential, the circumferential surface (the image holding surface) of the photoconductor drum 21 on which an image is formed, an exposure device 23 serving as an example of an exposure unit that forms an electrostatic latent image (for the corresponding color) having a potential difference by irradiating the electrically charged circumferential surface of the photoconductor drum 21 with a light beam LB based on information (a signal) of the image, a developing device 24 serving as a developing unit that develops the electrostatic latent image with toner in a developer of the corresponding color (Y, M, C, or K) into a toner image, a first transfer device 25 serving as an example of a first transfer unit that transfers each toner image to the intermediate transfer device 30, and a drum cleaning device 26 that cleans the photoconductor drum 21 by removing extraneous matter such as toner left on and adhering to the image holding surface of the photoconductor drum 21 after first transfer. Broken lines in the drawing indicate transport paths along which the recording sheets 6 are transported in the apparatus body 1*a*.

The intermediate transfer device 30 is disposed below the image forming devices 20 (20Y, 20M, 20C, and 20K). The intermediate transfer device 30 includes an intermediate transfer belt 31 that circularly moves in a direction of arrow B while passing through first transfer positions T1 located below the photoconductor drums 21 of the image forming devices 20 (20Y, 20M, 20C, and 20K). At the first transfer positions T1, the first transfer devices 25 (first transfer rollers) are in contact with the circumferential surfaces of the photoconductor drums 21 with the intermediate transfer belt 31 interposed therebetween. Each first transfer device 25 receives a first transfer bias voltage with a polarity opposite to the polarity of the toner image on the photoconductor drum 21 from a high voltage power supply not illustrated. The intermediate transfer belt 31 is circularly movably supported by multiple belt support rollers 32 to 37 on the inner circumference to be held in an intended state. Among the multiple belt support rollers 32 to 37, the belt support roller 32 serves as a driving roller, the belt support rollers 33 and 35 serve as driven rollers that hold the intermediate transfer belt 31 in, for example, the traveling position, the belt support roller 34 serves as a tensioning roller, the belt support roller 36 serves as a second-transfer back-up roller, and the belt support roller 37 serves as a support roller of a belt cleaning device 38.

A second transfer device 40 that second-transfers the toner images on the intermediate transfer belt 31 to the recording sheets 6 is disposed on the outer circumferential surface (the image holding surface) of the intermediate transfer belt 31 supported by the belt support roller 36. The second transfer device 40 is a contact transfer device including the belt support roller 36 that supports the intermediate transfer belt 31 at a second transfer position T2, and a second transfer roller 41 that rotates while being in contact with a portion of the outer circumferential surface of the intermediate transfer belt 31 supported by the belt support roller 36. In the first exemplary embodiment, the second transfer roller 41 is grounded. The belt support roller 36 receives a predetermined second transfer bias voltage with a negative polarity, the same as the polarity with which the toner is charged, from a high voltage power supply not illustrated through a bias application roller 39. The belt cleaning device 38 is disposed on the intermediate transfer belt 31 downstream from the second transfer device 40. The belt cleaning device 38 cleans the intermediate transfer belt 31 by removing extraneous matter such as toner or paper dust left on and adhering to the surface of the intermediate transfer belt 31. In the first exemplary embodiment, the second transfer roller 41 is grounded, and the belt support roller 36 receives a predetermined second transfer bias voltage with a negative polarity the same as the polarity with which toner is charged, but this structure is not the only possible example. Alternatively, the belt support roller 36 may be grounded, and the second transfer roller 41 may receive a predetermined second transfer bias voltage with a positive polarity opposite to the polarity with which toner is charged.

The fixing device 50 includes components such as a heating belt 51 that is heated by a heater (heat source) to keep the surface temperature at a predetermined temperature, and a pressing roller 52 that rotates while being in contact with the heating belt 51 with a predetermined pressure. In this fixing device 50, a contact portion where the heating belt 51 and the pressing roller 52 are in contact serves as a fixing nip where a predetermined fixing process (heating and pressing) is performed. The fixing device will be described below in detail.

The sheet feeding device 60 is disposed below the intermediate transfer device 30. The sheet feeding device 60 roughly includes one sheet container (or multiple sheet containers) 61 that accommodates a stack of recording sheets 6 of an intended size or an intended type, and a pick-up device 62 that picks up the recording sheets 6 one by one from the sheet container 61. The sheet container 61 is attached to be drawn out to, for example, the front of the apparatus body 1*a* (the side that a user faces when operating the image forming apparatus 1).

Examples of the recording sheets 6 include thin paper sheets including ordinary sheets or tracing paper sheets used for, for example, an electrophotographic copying machine or a printer, and overhead projector (OHP) sheets formed from transparent film media made of a synthetic resin (such as polyethylene terephthalate (PET)). To further improve the smoothness of the image surface that has undergone fixing, the surface of the recording sheet 6 is preferably as smooth as possible. For example, a coated paper sheet obtained by coating either one or both of the top and back surfaces of an ordinary sheet with resin or another material is preferably usable.

As examples of the recording sheets 6, cardboard with a relatively large basis weight such as art paper for printing, embossed paper with uneven surfaces, or cardboard with a large thickness such as a postcard is usable in accordance with a variety of user needs.

A fed-sheet transport path 67 is disposed between the sheet feeding device 60 and the second transfer device 40. The fed-sheet transport path 67 includes one or more pairs of sheet transport rollers 63 to 66 that transport the recording sheets 6 fed from the sheet feeding device 60 to the second transfer position T2, and a transport guide member not illustrated. The pair of sheet transport rollers 66 disposed at a position immediately in front of the second transfer position T2 on the fed-sheet transport path 67 serve as, for example, rollers (registration rollers) that adjust the timing to transport the recording sheets 6.

A sheet transport path 71 is disposed between the second transfer device 40 and the fixing device 50. The sheet transport path 71 includes multiple (or any one of) sheet transport belts 68, 69, and 70 that transport the recording sheets 6 fed from the second transfer device 40 to the fixing device 50.

A discharging transport path 74 is disposed downstream from the fixing device 50. The discharging transport path 74 includes sheet discharging rollers 73 that discharge the recording sheet 6 to which a toner image is fixed by the fixing device 50 to a sheet discharge portion 72 disposed on the side surface of the apparatus body 1*a*.

A reverse transport path 75 that allows the recording sheets 6 to be turned upside down diverges downward from a portion of the discharging transport path 74. A switching member not illustrated that switches the transport direction of the recording sheets 6 is disposed at the divergence point of the discharging transport path 74. A pair of reverse rollers 76 capable of switching the rotation direction between a forward rotation direction and a reverse rotation direction are disposed on the reverse transport path 75. A both-side transport path 77 that diverges leftward from a portion above the pair of reverse rollers 76 is connected with the reverse transport path 75. Multiple pairs of both-side transport rollers 78 to 81 that transport the upside-down recording sheets 6 to the fed-sheet transport path 67 and a transport guide member not illustrated are disposed on the both-side transport path 77.

FIG. 1 also illustrates a controller 100 serving as an example of a control unit that generally controls the operations of the image forming apparatus 1, and an operating device 14 that operates the image forming apparatus 1. The operating device 14 includes an operation panel 14*a* that receives inputs of the type of the recording sheets 6 or the number of recording sheets 6 to be recorded, and a display panel 14*b* that displays the inputs of the type of the recording sheets 6 or the number of recording sheets 6 to be recorded.

Operation of Image Forming Apparatus

A basic image forming operation performed by the image forming apparatus 1 will be described below.

An image forming operation performed to form a full-color image with a combination of four-color (Y, M, C, and K) toner images using the four image forming devices 20 (20Y, 20M, 20C, and 20K) will be described below.

When the image forming apparatus 1 receives request command information for an image forming operation (print) through the operating device 14, the controller 100 controls components including the four image forming devices 20 (20Y, 20M, 20C, and 20K), the intermediate transfer device 30, the second transfer device 40, the fixing device 50, and the sheet feeding device 60 to actuate the components.

In each of the image forming devices 20 (20Y, 20M, 20C, and 20K), the photoconductor drum 21 rotates in a direction of arrow A, and the charging device 22 electrically charges the surface of the photoconductor drum 21 with an intended polarity (a negative polarity in the first exemplary embodiment) and an intended potential. Subsequently, the exposure device 23 exposes the electrically charged surface of the photoconductor drum 21 with a light beam LB emitted based on an image signal obtained by converting image information input into the image forming apparatus 1 into a corresponding color component (Y, M, C, or K) to form, on the surface, an electrostatic latent image of the color component formed by a predetermined potential difference.

Subsequently, each of the developing devices 24 develops the electrostatic latent image of the color component formed on the photoconductor drum 21 by electrostatically adhering toner of the corresponding color (Y, M, C, or K) electrically charged with the intended polarity (negative polarity) to the electrostatic latent image. With this development, the electrostatic latent image of the color component formed on the photoconductor drum 21 is developed with toner of the corresponding color and formed into a toner image of any of four colors (Y, M, C, and K) as a visible image.

Subsequently, when the toner image of the corresponding color formed on the photoconductor drum 21 of each of the image forming devices 20 (20Y, 20M, 20C, and 20K) is transported to the first transfer position T1, the first transfer device 25 first-transfers the toner image of the corresponding color to sequentially overlap the toner image on the intermediate transfer belt 31 in the intermediate transfer device 30 that rotates in the direction of arrow B.

In each image forming device 20 that has finished first transfer, the drum cleaning device 26 scratches off extraneous matter to clean the surface of the photoconductor drum 21. Thus, each image forming device 20 is prepared for the next image forming operation.

Subsequently, the intermediate transfer device 30 holds the first-transferred toner image and transports the toner image to the second transfer position T2 with rotation of the intermediate transfer belt 31. The sheet feeding device 60 feeds an intended recording sheet 6 to the fed-sheet transport path 67 in accordance with the image forming operation. On the fed-sheet transport path 67, the pair of sheet transport rollers 66 serving as registration rollers feed the recording sheet 6 to the second transfer position T2 in accordance with transfer timing.

At the second transfer position T2, the second transfer roller 41 collectively second-transfers the toner images on the intermediate transfer belt 31 to the recording sheet 6. In the intermediate transfer device 30 that has finished second transfer, the belt cleaning device 38 removes extraneous matter such as toner left on the surface of the intermediate transfer belt 31 after second transfer to clean the intermediate transfer belt 31.

Subsequently, after being released from the intermediate transfer belt 31 and the second transfer roller 41, the recording sheet 6 to which the toner image is second-transferred is transported to the fixing device 50 by the sheet transport belts 68, 69, and 70. The fixing device 50 introduces the second-transferred recording sheet 6 into the fixing nip between the rotating heating belt 51 and the rotating pressing roller 52 to allow the recording sheet 6 to pass through the fixing nip to fix an unfixed toner image to the recording sheet 6 through a fixing process (heating and pressing).

The recording sheet 6 that has undergone the fixing process is discharged by the sheet discharging rollers 73 through the discharging transport path 74 to the sheet discharge portion 72 disposed on the side surface of the image forming apparatus 1.

When the image forming apparatus 1 is to form images on both surfaces of the recording sheet 6, a switching member not illustrated switches the transport path for the recording sheet 6 from the discharging transport path 74 to the reverse transport path 75 without the sheet discharging rollers 73 discharging the recording sheet 6 having an image on one surface to the sheet discharge portion 72. While the recording sheet 6 guided to the reverse transport path 75 has the trailing end held between the pair of reverse rollers 76, the pair of reverse rollers 76 have their rotation direction switched from the forward rotation direction to the reverse rotation direction to transport the recording sheet 6 to the both-side transport path 77 while the recording sheet 6 is turned upside down. The recording sheet 6 transported to the both-side transport path 77 is transported to the fed-sheet transport path 67 by multiple pairs of both-side transport rollers 78 to 81, and receives toner images on the back surface from the intermediate transfer belt 31. Thereafter, the recording sheet 6 is transported to the fixing device 50 to have the toner image transferred to the back surface fixed (heated and pressed) by the fixing device 50, and is then discharged to the sheet discharge portion 72 by the sheet discharging rollers 73 through the discharging transport path 74.

With the above operation, a full-color image formed with a combination of toner images of toner of the four colors (Y, M, C, and K) is formed on at least one of the surfaces of the recording sheet 6. When receiving a request command for performing the image forming operation for multiple sheets, the image forming apparatus 1 repeatedly performs the image forming operation for the multiple sheets in a similar manner. Besides forming a full-color image in the above manner, the image forming apparatus 1 also forms, on the recording sheet 6, an image with an appropriate combination of toner images of one to three colors including a monochrome image through the similar image forming operation by forming the toner images with one to three image forming devices.

Structure of Fixing Device

The image forming apparatus 1 with the above structure includes the fixing device 50 serving as an example of a fixing unit that fixes the image formed on the surface of the recording medium.

Figure 2:
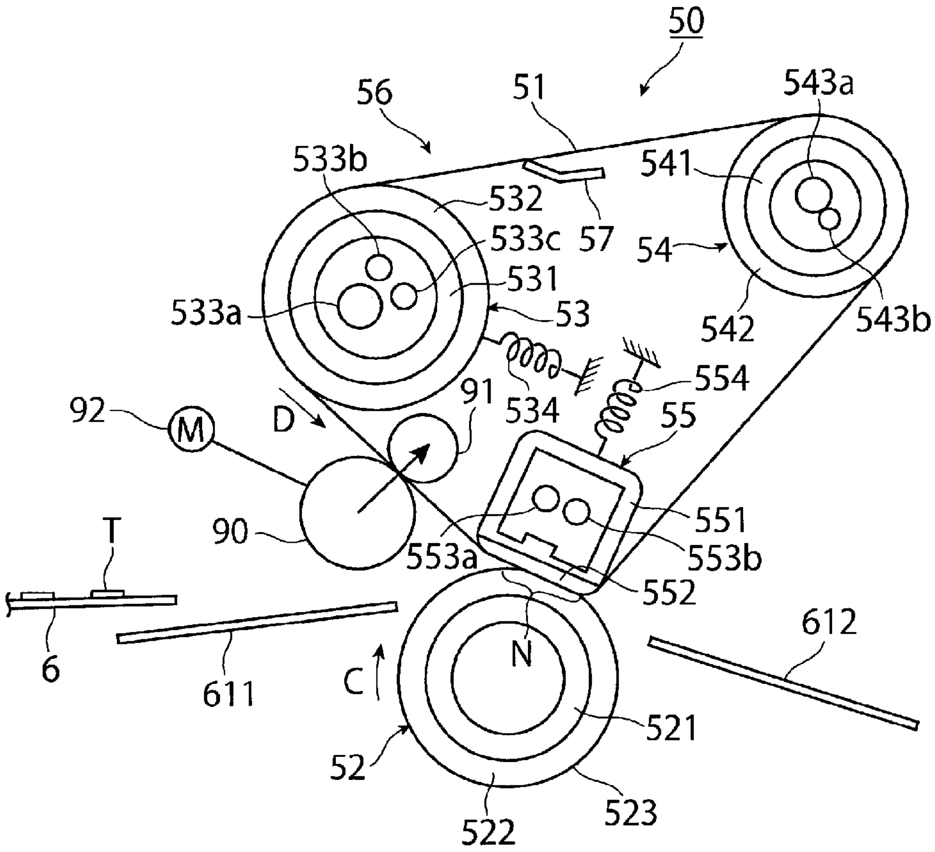
FIG. 2 is a diagram of the fixing device according to the first exemplary embodiment of the present disclosure.

As illustrated in FIG. 2, the fixing device 50 according to the first exemplary embodiment roughly includes the heating belt 51 serving as an example of an endless belt, and the pressing roller 52 serving as an example of a pressing member that comes into pressure contact with the heating belt 51. The heating belt 51 is rotatably (circularly movably) stretched with an intended tension around the outer circumferential surfaces of an internal heating roller 53 (a first stretching roller), a steering roller 54 (a second stretching roller), and a pressing pad 55 (a pressing member). The internal heating roller 53, the steering roller 54, and the pressing pad 55 serve as examples of multiple stretchers disposed on the inner circumferential surface of the heating belt 51. The multiple stretchers are not limited to the above combination of the internal heating roller 53, the steering roller 54, and the pressing pad 55, but only the internal heating roller 53 may be included, or the multiple stretchers may be a combination of the internal heating roller 53 and the steering roller 54 or a combination of four or more stretchers including, for example, another internal heating roller, an external heating roller, or a stretching roller. The steering roller 54 corresponds to one of the multiple stretchers that is displaced to correct positional deviation of the heating belt 51. The heating belt 51, the internal heating roller 53, the steering roller 54, and the pressing pad 55 constitute a heating belt module 56 serving as an example of a belt transport device. Instead of the pressing pad 55, a rotatable roller may be used as a stretcher.

The heating belt module 56 includes a contact member 57 between the internal heating roller 53 and the steering roller 54. The contact member 57 is formed from, for example, a wick that comes into contact with the inner circumferential surface of the heating belt 51 to clean the inner circumferential surface and feeds a lubricant as appropriate.

Figure 3:
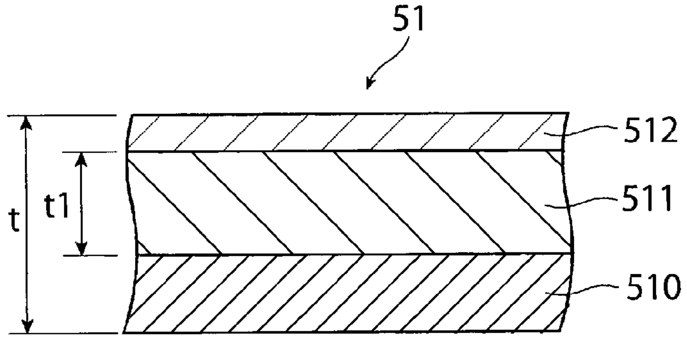
FIG. 3 is a cross-sectional view of a heating belt.

The heating belt 51 is a flexible endless belt. As illustrated in FIG. 3, the heating belt 51 includes a base layer 510, an elastic layer 511 coated on the surface of the base layer 510, and a surface layer 512 coated on the surface of the elastic layer 511.

The base layer 510 is formed from a thermoresistant synthetic resin such as a polyimide resin, a polyamide resin, or a polyamide-imide resin, or a metal such as stainless steel, nickel, or copper. The base layer 510 preferably has a thickness of equal to or larger than 10 μm and equal to or smaller than 100 μm, more preferably, equal to or larger than 20 μm and equal to or smaller than 60 μm.

The elastic layer 511 is formed from a thermoresistant elastic material such as silicone rubber or fluorocarbon rubber. The elastic layer 511 preferably has a thickness of equal to or larger than 30 μm and equal to or smaller than 600 μm, more preferably, equal to or larger than 100 μm and equal to or smaller than 500 μm.

The surface layer 512 is formed from a material such as perfluoroalkoxy alkanes (PFA) or polytetrafluoroethylene (PTFE). The surface layer 512 preferably has a thickness of equal to or smaller than 100 μm, more preferably, equal to or larger than 5 μm and equal to or smaller than 50 μm, or particularly preferably, equal to or larger than 10 μm and equal to or smaller than 40 μm.

The heating belt 51 may have a full thickness t of, for example, approximately 50 μm to 800 μm. In accordance with the variety of the recording sheet 6 including cardboard with a relatively large basis weight and embossed paper with uneven surfaces, the elastic layer 511 preferably has a relatively large thickness. In the first exemplary embodiment, when the full thickness of the heating belt 51 is t, the elastic layer 511 preferably has a thickness t1 of 0.6 t≥t1≥0.2 t, or more preferably 0.5 t≥t1≥0.3 t. When the thickness t1 of the elastic layer 511 exceeds 0.6 t, heat with which the heating belt 51 is heated to a predetermined fixing temperature may increase, whereas when the thickness t1 of the elastic layer 511 falls below 0.2 t, the fixing performance with respect to cardboard with a relatively large basis weight may decrease.

As appropriate, an adhesion layer not illustrated is interposed between the base layer 510 and the elastic layer 511.

The heating belt 51 is in pressure contact with the pressing roller 52 at an area wound around the outer circumferential surface of the pressing pad 55. The pressure contact portion where the heating belt 51 and the pressing pad 55 are in pressure contact constitutes a fixing nip N through which the recording sheet 6 passes while holding an unfixed toner image T.

A planar first guide member 611 that guides the recording sheet 6 carrying the unfixed toner image T to the fixing nip N is disposed at the entrance of the fixing nip N in the direction in which the recording sheet 6 is transported. A planar second guide member 612 that guides the recording sheet 6 to which the unfixed toner image T is fixed to the outside of the fixing device 50 is disposed at the exit of the fixing nip N in the direction in which the recording sheet 6 is transported.

The exit of the fixing nip N has a recessed shape with respect to the surface of the pressing roller 52 to suddenly change the pressing force of the heating belt 51 to release, from the surface of the heating belt 51 using the stiffness of the recording sheet 6 and the curvature of the heating belt 51, the recording sheet 6 subjected to the fixing operation at the fixing nip N where the heating belt 51 and the pressing pad 55 are in pressure contact.

A release support member such as a release pick not illustrated that forcefully releases the recording sheet 6 from the surface of the heating belt 51 may be disposed at the exit of the fixing nip N.

The internal heating roller 53 includes a hollow cylindrical core 531 formed from a metal such as stainless steel, aluminum, or iron (a thin-walled high strength steel pipe), and a coat layer 532 formed from, for example, a thermoresistant synthetic resin or a thermoresistant elastic material, such as thermoresistant silicone rubber or fluorocarbon rubber, coated on the outer circumferential surface of the core 531 with a uniform thickness. The internal heating roller 53 has its outer circumferential surface with a cylindrical shape. As appropriate, a release layer formed from, for example, perfluoroalkoxy alkanes (PFA) or polytetrafluoroethylene (PTFE) may be disposed on the surface of the coat layer 532 of the internal heating roller 53. Multiple (three in the illustrated example) halogen lamps **533*a*, 533*b*, and 533*c* are disposed as examples of heating units (heat sources) inside the internal heating roller 53. The three halogen lamps 533*a*, 533*b*, and 533*c* each have a heating area appropriately set in accordance with, for example, the size in the direction crossing the direction in which the recording sheet 6** is transported.

The internal heating roller 53 presses the heating belt 51 outward in the radial direction from the inside of the heating belt 51 using a first coil spring 534 serving as a first urging member to apply an intended tension to the heating belt 51.

As in the internal heating roller 53, the steering roller 54 includes a hollow cylindrical core 541 formed from a metal such as stainless steel, aluminum, or iron (a thin-walled high strength steel pipe), and a coat layer 542 formed from, for example, a thermoresistant synthetic resin or a thermoresistant elastic material, such as thermoresistant silicone rubber or fluorocarbon rubber, coated on the outer circumferential surface of the core 541 with a uniform thickness. The steering roller 54 has an outer circumferential surface with a cylindrical shape. As appropriate, a release layer formed from, for example, perfluoroalkoxy alkanes (PFA) or polytetrafluoroethylene (PTFE) may be disposed on the surface of the coat layer 542 of the steering roller 54. Multiple (two in the illustrated example) halogen lamps **543*a* and 543*b* are disposed as examples of heating units (heat sources) inside the steering roller 54. The two halogen lamps 543*a* and 543*b* each have a heating area appropriately set in accordance with, for example, the size in the direction crossing the direction in which the recording sheet 6 is transported. The steering roller 54 has a smaller outer diameter than the internal heating roller 53. The steering roller 54** may naturally exclude halogen lamps serving as examples of heating units (heat sources).

As illustrated in FIG. 2, the pressing pad 55 is formed from, for example, a stiff material such as aluminum, stainless steel, iron, or synthetic resin, and has a cross section with a substantially angular hollow or solid tube shape. The pressing pad 55 is integrally formed from, for example, a metal such as aluminum, stainless steel, or iron. However, the material of the pressing pad 55 is not limited to these, and may be a combination of two or more materials, such as a combination of metals including aluminum, stainless steel, and iron, or a combination of a synthetic resin and a metal such as aluminum, stainless steel, or iron. In the present exemplary embodiment, the pressing pad 55 includes a pad body 551 having a cross section of a substantially angular hollow tube and formed from a metal such as aluminum, stainless steel, or iron, and a pressing member 552 disposed on the pad body 551 to face the pressing roller 52.

The pressing member 552 is formed from a thermoresistant and stiff synthetic resin such as polyphenylenesulfide (PPS), polyimide, polyester, or polyamide, or a metal such as iron, aluminum, or stainless steel.

Multiple (two in the illustrated example) halogen lamps **553*a* and 553*b* are disposed as examples of heating units (heat sources) inside the pressing pad 55. The two halogen lamps 553*a* and 553*b* each have a heating area appropriately set in accordance with, for example, the size in the direction crossing the direction in which the recording sheet 6** is transported.

The pressing pad 55 presses the heating belt 51 with a coil spring 554 serving as a second urging member with an intended pressing force against the outer circumferential surface of the pressing roller 52 from the inner side of the heating belt 51.

The internal heating roller 53, the steering roller 54, and the pressing pad 55 have their surface temperature detected by multiple temperature sensors not illustrated serving as examples of temperature detecting members. The internal heating roller 53, the steering roller 54, and the pressing pad 55 heat the surface of the heating belt 51 to an intended fixing temperature (for example, between 170° C. to 190° C.) by controlling the current fed to the halogen lamps **533*a*, 533*b*, and 533*c*, the halogen lamps 543*a* and 543*b*, and the halogen lamps 553_a_ and 553**_b_ based on the detection results from the temperature sensors using a temperature control circuit including, for example, a triode AC switch (TRIAC) not illustrated.

The pressing roller 52 includes a hollow or solid cylindrical core 521 formed from a metal such as stainless steel, aluminum, or iron (a thin-walled high strength steel pipe), an elastic layer 522 formed from a thermoresistant elastic material such as silicone rubber or fluorocarbon rubber coated on the outer circumferential surface of the core 521, and a release layer 523 formed from, for example, perfluoroalkoxy alkanes (PFA) or polytetrafluoroethylene (PTFE) coated on the outer circumferential surface of the elastic layer.

The pressing roller 52 is rotatably supported by a frame of the fixing device 50 not illustrated with a bearing member interposed therebetween. The pressing roller 52 is driven to rotate in an arrow direction C by a driving member not illustrated. The pressing roller 52 is movable in a direction to be in contact with or away from the pressing pad 55 in the heating belt module 56 by a contact/separation member not illustrated.

While being in pressure contact with the outer circumferential surface of the pressing roller 52, the heating belt 51 is driven to rotate at a uniform speed in an arrow direction D with rotation of the pressing roller 52.

Figure 4:
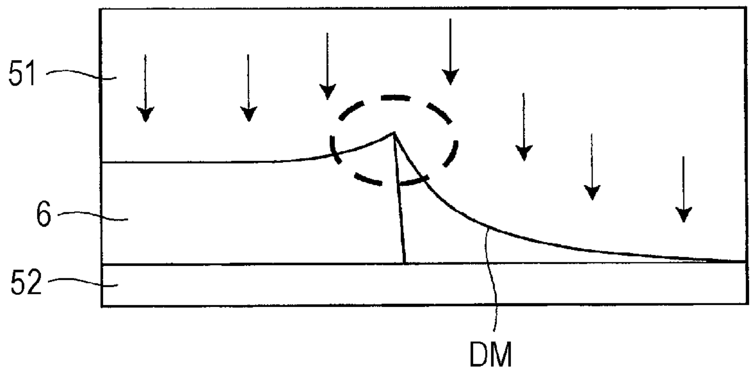
FIG. 4 is a schematic diagram of a belt flaw occurring on the surface of the heating belt.
Figure 5:
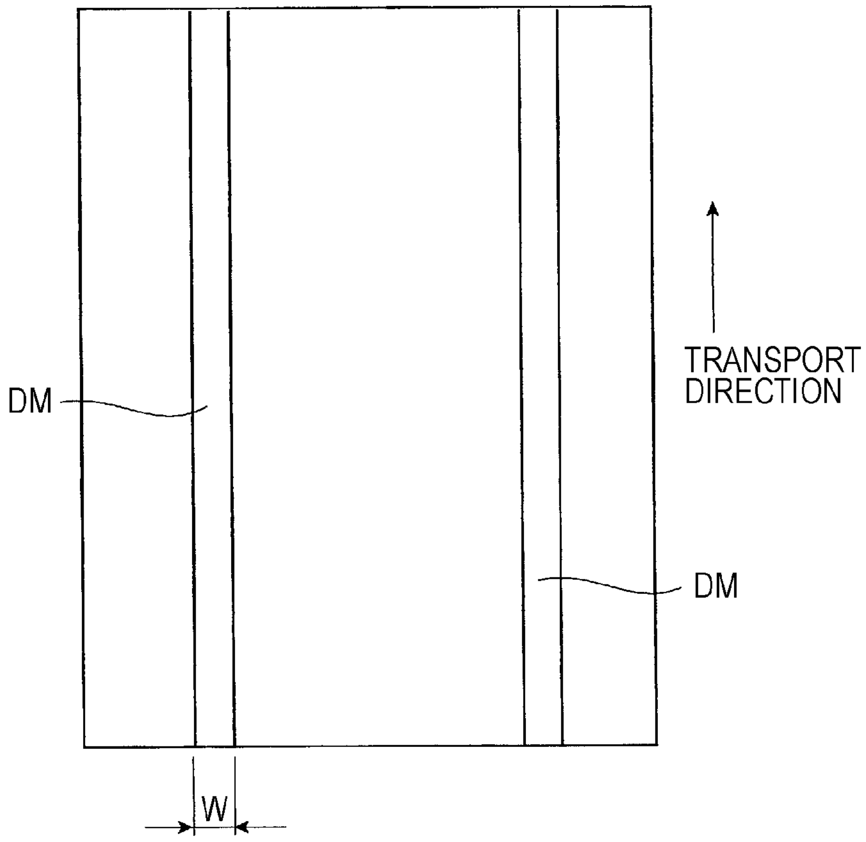
FIG. 5 is a schematic plan view of belt flaws that occur on the surface of the heating belt.

As illustrated in FIG. 4, in the fixing device 50 with the above structure, the heating belt 51 comes into pressure contact with the surface of the recording sheet 6 to fix the unfixed toner image T formed on the surface of the recording sheet 6 at the fixing nip N where the heating belt 51 and the pressing roller 52 are in pressure contact with each other. At this time, the heating belt 51 has, at each of portions corresponding to both edge portions in a width direction crossing the direction in which the recording sheet 6 is transported, a step corresponding to the thickness of the recording sheet 6 between the surface of the recording sheet 6 and the surface of the pressing roller 52. Thus, the heating belt 51 has the surface unevenly deformed to have a damage called a belt flaw DM for a predetermined width W resulting from a sudden release of the pressing force of, for example, the surface layer 512 and the elastic layer 511 of the heating belt compressed in accordance with the thickness of the recording sheet 6 at the portions corresponding to the edge portions of the recording sheet 6.

The belt flaw DM that occurs on the surface of the heating belt 51 is particularly highly likely to occur when multiple recording sheets 6 of the same size are successively fixed. When the number of recording sheets to be successively fixed increases to several tens to several hundreds, the belt flaw DM is more highly likely to occur.

When the belt flaw DM occurs on the surface of the heating belt 51 after the fixing operation, the belt flaw DM causes streaky gloss unevenness or another flaw appearing on the image on the recording sheet 6 subsequently undergoing fixing, and degrades the image quality.

As illustrated in FIG. 2, the fixing device 50 according to the first exemplary embodiment includes a refresh roller 90 serving as an example of a restorer that is pressed against the surface of the heating belt 51 subjected to the fixing operation to restore the surface of the heating belt 51 to the state before the fixing operation.

As illustrated in FIG. 3, the heating belt 51 includes the base layer 510, the elastic layer 511, and the surface layer 512. When the heating belt 51 passes through the fixing nip N to receive a pressing force that is uniform in the direction along the surface, regardless of when the pressing force is relatively large, for example, the elastic layer 511 is uniformly compressed to be elastically deformed, and, after passing through the fixing nip N, restored to the original shape with elastic resilience.

Figure 6A:
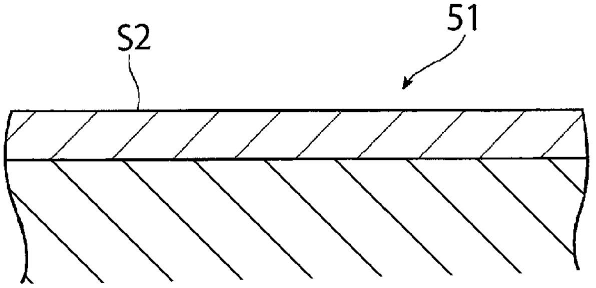
FIGS. 6A and 6B are schematic cross-sectional views of a belt flaw that occurs on the surface of the heating belt.
Figure 6B:
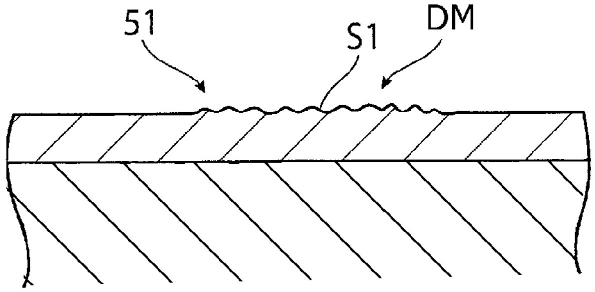

However, as illustrated in FIG. 4, when passing through the fixing nip N, the heating belt 51 receives shearing force from the edge portions of the recording sheet 6 at both portions corresponding to the edge portions of the recording sheet 6 in the width direction of the recording sheet 6 to have the surface layer 512 and the elastic layer 511 unevenly deformed or partially deformed. Thus, as illustrated in FIG. 6, a surface state S1 after the fixing operation is changed from a surface state S2 before the fixing operation. The surface state S2 of the heating belt 51 before the fixing operation is a flat state or a nearly mirror finished state. In contrast, the surface state S1 of the heating belt 51 after the fixing operation is the state changed from the flat state to the state having fine unevenness for a predetermined width W.

The change of the surface state of the heating belt 51 before the fixing operation and after the fixing operation varies depending on various factors such as the basis weight of the recording sheet 6, the material quality of the recording sheet 6 (such as the modulus of elasticity), or the surface state of the recording sheet 6.

Figure 7:
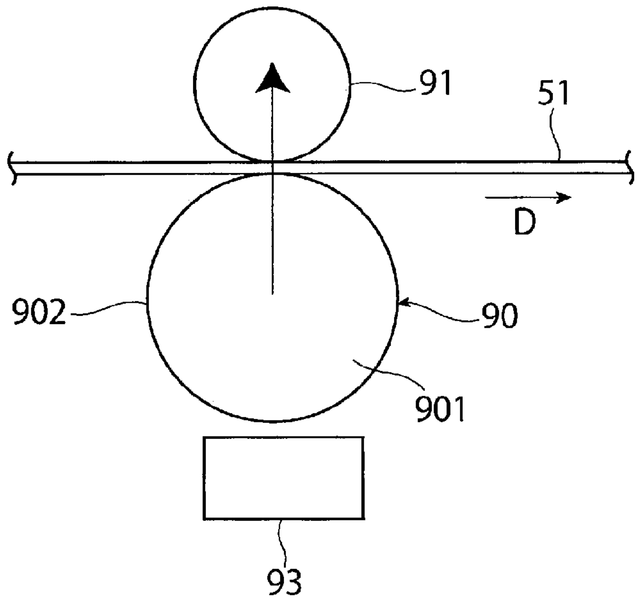
FIG. 7 is a diagram of a structure of a refresh roller.

As illustrated in FIG. 2, the refresh roller 90 is disposed upstream from the fixing nip N in the direction in which the heating belt 51 moves. In the first exemplary embodiment, the refresh roller 90 is disposed between the internal heating roller 53 and the pressing pad 55. As illustrated in FIG. 2 and FIG. 7, a back-up roller 91 is fixed onto the back surface of the heating belt 51 facing the refresh roller 90. The refresh roller 90 is driven by a driving motor 92 to rotate at a predetermined rotation speed in the direction the same as or opposite to the direction in which the heating belt 51 moves.

As illustrated in FIG. 7, the refresh roller 90 includes, for example, a cylindrical roller core 901 formed from a metal such as stainless steel, and a roughened surface layer 902 having preset surface roughness disposed on the surface of the cylindrical roller core 901. The roughened surface layer 902 of the refresh roller 90 is formed by roughening the surface of the roller core 901 to have preset surface roughness. The roughened surface layer 902 of the refresh roller 90 is formed by closely bonding abrasive grains to the surface of the roller core 901 to have preset surface roughness.

The refresh roller 90 grinds the surface of the heating belt 51 to restore the surface state of the heating belt 51 to the nearly mirror finished state or the state before the fixing operation. However, the refresh roller 90 does not have to completely restore the surface state of the heating belt 51 to the state before the fixing operation, and may restore the surface state of the heating belt 51 to be approximate to the nearly mirror finished state before the fixing operation by eliminating or reducing fine unevenness on the surface of the heating belt 51.

As illustrated in FIG. 7, the refresh roller 90 is brought by a pressing mechanism 93 into pressure contact with the surface of the heating belt 51 having the back surface supported by the back-up roller 91 at a predetermined pressing force. For example, the pressing mechanism 93 displaces a bearing member that rotatably supports the rotation shaft of the refresh roller 90 with, for example, an eccentric cam in a direction to bring the bearing member into pressure contact with the surface of the heating belt 51, and controls the pressing force (pressure). Instead of the above structure, the pressing mechanism 93 may have any structure that presses the refresh roller 90 against the surface of the heating belt 51 and changes (adjusts) the pressing force.

The refresh roller 90 finely grinds the surface of the heating belt 51 to restore the heating belt 51 to the state before the fixing operation. When the refresh roller 90 has a relatively small pressing force, the refresh roller 90 may fail to fully smoothen the surface of the heating belt 51 and allow, for example, streaky gloss unevenness to appear on the image of the recording sheet 6 to be subsequently subjected to the fixing operation.

On the other hand, when the refresh roller 90 has a relatively large pressing force, the refresh roller 90 may excessively grind the surface of the heating belt 51 to shorten the life of the heating belt 51.

Japanese Unexamined Patent Application Publication No. 2020-086349 describes a fixing device that includes a sliding member that comes into contact with a surface of a fixing member to slide over the surface, and a controller that controls sliding time of the sliding member based on a total count of passed recording media from a predetermined timing. The controller determines the sliding time based on a sliding-time-calculation count of passed sheets calculated based on the total count of passed sheets. The sliding-time-calculation count of passed sheets is calculated with the sum total of the values acquired by multiplying the count of the passed sheets by each of adjustment coefficients that vary around a threshold preset for the total count of passed sheets. The controller varies the contact pressure of a sliding member against the fixing member around the threshold.

However, as illustrated in FIG. 3 in Japanese Unexamined Patent Application Publication No. 2020-086349, the fixing device in Japanese Unexamined Patent Application Publication No. 2020-086349 is designed to change the contact pressure of the sliding member after the total count of the passed recording sheets exceeds about 10000 to reduce fixing errors and reduce shortening of the life of the fixing member, and fails to fully reduce fixing errors before the total count of the passed recording sheets arrives at 10000. In addition, the fixing device in Japanese Unexamined Patent Application Publication No. 2020-086349 fails to change the pressing force of the refresh roller 90 in accordance with the surface state of the heating belt 51 despite before the total count of the passed recording sheets arrives at 10000.

The fixing device according to the first exemplary embodiment thus includes a changer that changes the pressing load of the restorer in accordance with the difference in the state of the surface of the belt between before the fixing operation and after the fixing operation instead of changing the contact pressure of the sliding member in accordance with the total count of the passed recording sheets.

The difference in the state of the surface of the belt between before the fixing operation and after the fixing operation may be determined every time after each recording sheet is fixed or every time after each preset number of recording sheets are fixed.

In the fixing device according to the first exemplary embodiment, the difference in the state of the surface of the belt between before the fixing operation and after the fixing operation depends on the properties of the recording medium.

In the fixing device according to the first exemplary embodiment, the difference in the state of the surface of the belt between before the fixing operation and after the fixing operation is determined based on the basis weight of the recording medium.

More specifically, in the image forming apparatus 1 including the fixing device 50 according to the first exemplary embodiment, when starting an image forming operation, a user operates a user interface such as the operating device 14 to set the image forming conditions including the size or type of the recording sheet 6 on which an image is to be formed, the number of sheets to be printed, and whether the image is to be printed on one side or either side.

Figures 8, 9:
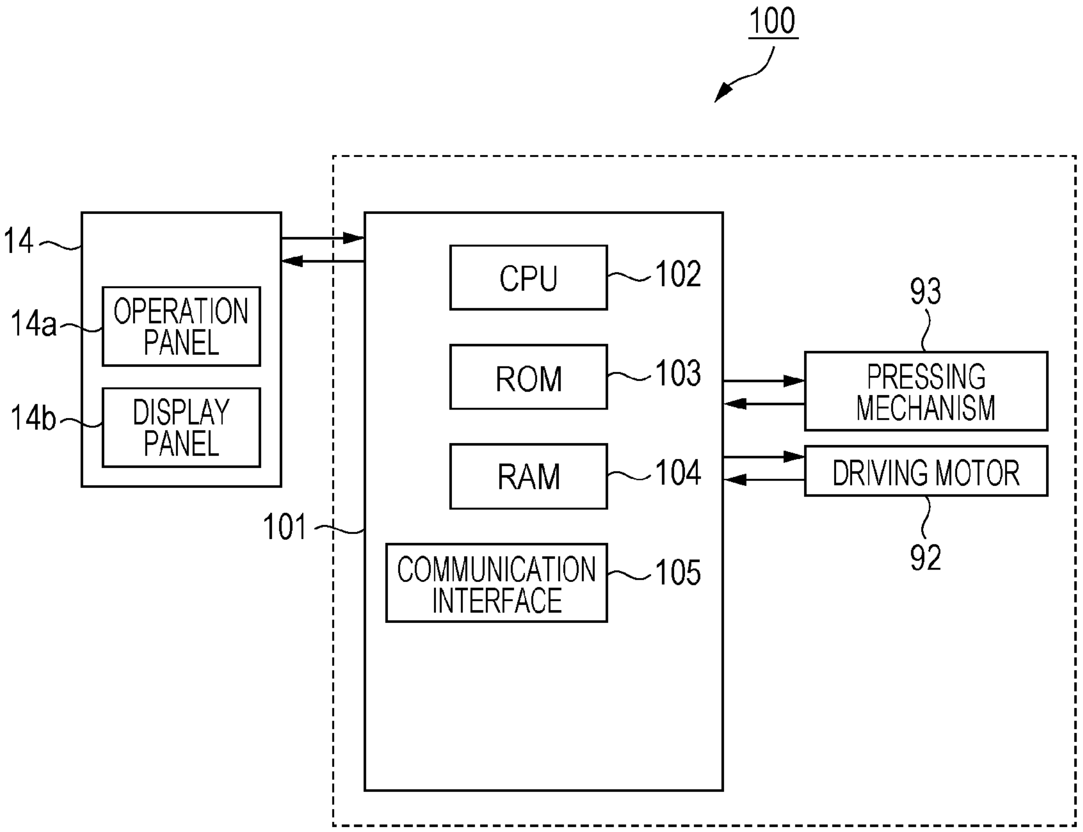
FIG. 8 is a block diagram of a controller in an image forming apparatus according to a first exemplary embodiment of the present disclosure.
FIG. 9 is a table illustrating the relationship between the basis weight of a recording sheet and a thrust amount of the refresh roller.

FIG. 8 is a block diagram of the controller 100 in the image forming apparatus.

In FIG. 8, a control unit 101 serves as an example of a control member (switch) of the controller 100 that generally controls the operation of the image forming apparatus 1. The control unit 101 includes, for example, a central processing unit (CPU) 102 that generally controls the image forming operation and functions as a changing member, a read only memory (ROM) 103 that stores, for example, a control program executed by the CPU 102, a random access memory (RAM) 104 that stores, for example, parameters used in the control program executed by the CPU 102, and a communication interface 105 that communicates with a bus, not illustrated, that connects components such as the CPU 102 and the ROM 103 to each other, an external personal computer, and an image reading device.

The control unit 101 receives, from the operating device 14 as appropriate, inputs of image forming conditions such as the size or type of the recording sheet 6 on which an image is to be formed, the number of sheets to be printed, and whether the image is to be printed on one side or either side. The control unit 101 controls the pressing mechanism 93 that changes the pressing force of the refresh roller 90, and the driving motor 92 that rotates the refresh roller 90.

As illustrated in FIG. 9, the ROM 103 stores, in advance, a table illustrating the relationship between the basis weight of the recording sheet 6 and the thrust amount (pressing force) of the refresh roller 90.

When the basis weight of the recording sheet 6 is equal to or smaller than 82 gsm, the thrust amount (pressing force) of the refresh roller 90 is relatively low. When the basis weight of the recording sheet 6 exceeds 82 gsm and is equal to or smaller than 200 gsm, the thrust amount (pressing force) of the refresh roller 90 is intermediate. When the basis weight of the recording sheet 6 exceeds 200 gsm, the thrust amount (pressing force) of the refresh roller 90 is relatively high.

Figure 10:
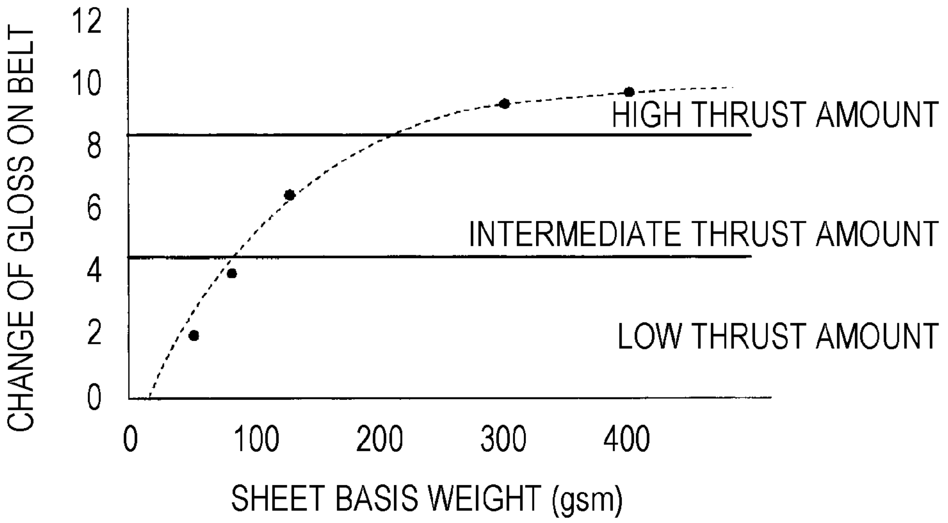
FIG. 10 is a graph illustrating the relationship between the basis weight of a recording sheet and a gloss change of the surface of the heating belt surface.

FIG. 10 is a graph illustrating the basis weight of the recording sheet 6 and a gloss change on the heating belt 51 when the recording sheet 6 with the corresponding basis weight is fixed.

As is clear from FIG. 10, when the basis weight of the recording sheet 6 is equal to or smaller than 82 gsm, the gloss change on the heating belt 51 after the fixing operation is low, and the thrust amount (pressing force) of the refresh roller 90 is relatively low, accordingly. When the basis weight of the recording sheet 6 exceeds 82 gsm and is equal to or smaller than 200 gsm, the gloss change on the heating belt 51 after the fixing operation is intermediate, and the thrust amount (pressing force) of the refresh roller 90 is thus intermediate, accordingly. When the basis weight of the recording sheet 6 exceeds 200 gsm, the gloss change on the heating belt 51 after the fixing operation is high, and the thrust amount (pressing force) of the refresh roller 90 is thus relatively high, accordingly.

In the following manner, the fixing device according to the first exemplary embodiment with the above structure further reduces damages on the belt surface after the fixing operation while retaining the life of the belt than in the structure not including a changer that changes the pressing load of the restorer in accordance with the difference in the state of the surface of the belt between before the fixing operation and after the fixing operation.

More specifically, in the image forming apparatus 1 including the fixing device 50 according to the first exemplary embodiment, as illustrated in FIG. 1, prior to the image forming operation, the user operates the operating device 14 to set the image forming conditions including the size or type of the recording sheet 6 on which an image is to be formed, the number of sheets to be printed, and whether the image is to be printed on one side or either side.

Then, the CPU 102 in the controller 100 switches the thrust amount (pressing force) of the refresh roller 90 in the fixing device 50 by driving the pressing mechanism 93 in accordance with the type (basis weight) of the recording sheet 6 specified by the operating device 14.

As illustrated in FIG. 1, in accordance with the start of the image forming operation, the image forming apparatus 1 feeds the specified recording sheet 6 with the sheet feeding device 60, forms an unfixed toner image T on the recording sheet 6, and fixes the unfixed toner image T formed on the recording sheet 6 with the fixing device 50.

Figure 11:
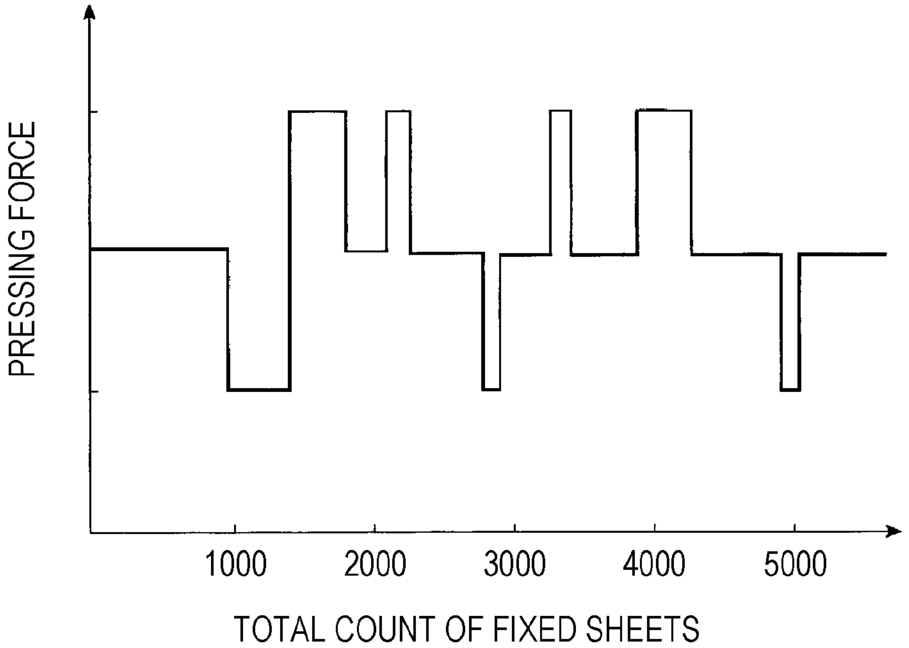
FIG. 11 is a graph illustrating the relationship between the total count of fixed recording sheets in the image forming apparatus according to the first exemplary embodiment of the present disclosure and the pressing force of a refresh roller.

FIG. 11 is a graph showing the relationship between the total count of recording sheets 6 fixed in the image forming apparatus 1 and the thrust amount (pressing force) of the refresh roller 90 in the fixing device 50.

FIG. 11 illustrates the case where, for example, the image forming apparatus 1 forms images on about 1000 recording sheets 6 of ordinary sheets, in total, with the basis weight within the range over 82 gsm to smaller than or equal to 200 gsm, then forms images on about 400 recording sheets 6 of thin sheets, in total, with the basis weight of smaller than or equal to 82 gsm, and then forms images on about 400 recording sheets 6 of cardboard, in total, with the basis weight over 200 gsm.

Although the actual image forming apparatus 1 normally changes the type of the recording sheets 6 per several sheets or several tens of sheets, FIG. 11 illustrates the case where the type of the recording sheets 6 is changed per several hundreds of sheets to form images, for convenience.

Thus, the image forming apparatus 1 according to the first exemplary embodiment changes the pressing force of the refresh roller 90 in accordance with the basis weight of the recording sheet 6, which is the factor that determines the difference in the state of the surface of the heating belt 51 between before the fixing operation and after the fixing operation. Thus, the image forming apparatus 1 reduces damages that occur on the surface of the heating belt 51 after the fixing operation while retaining the life of the heating belt 51.

In FIG. 11, the area surrounded by the graph indicates the amount by which the surface of the heating belt 51 is worn by the refresh roller 90. The amount of abrasion is a product of the pressing force of the refresh roller 90 and the total count of fixed recording sheets 6. Thus, changing the pressing force of the refresh roller 90 in accordance with the basis weight of the recording sheet 6 naturally reduces damages that occur on the surface of the heating belt 51 after the fixing operation in accordance with the difference in the basis weight of the recording sheet 6, and the reduction of the amount of abrasion of the surface of the heating belt 51 concurrently retains the life of the heating belt 51.

Second Exemplary Embodiment

Figure 12:
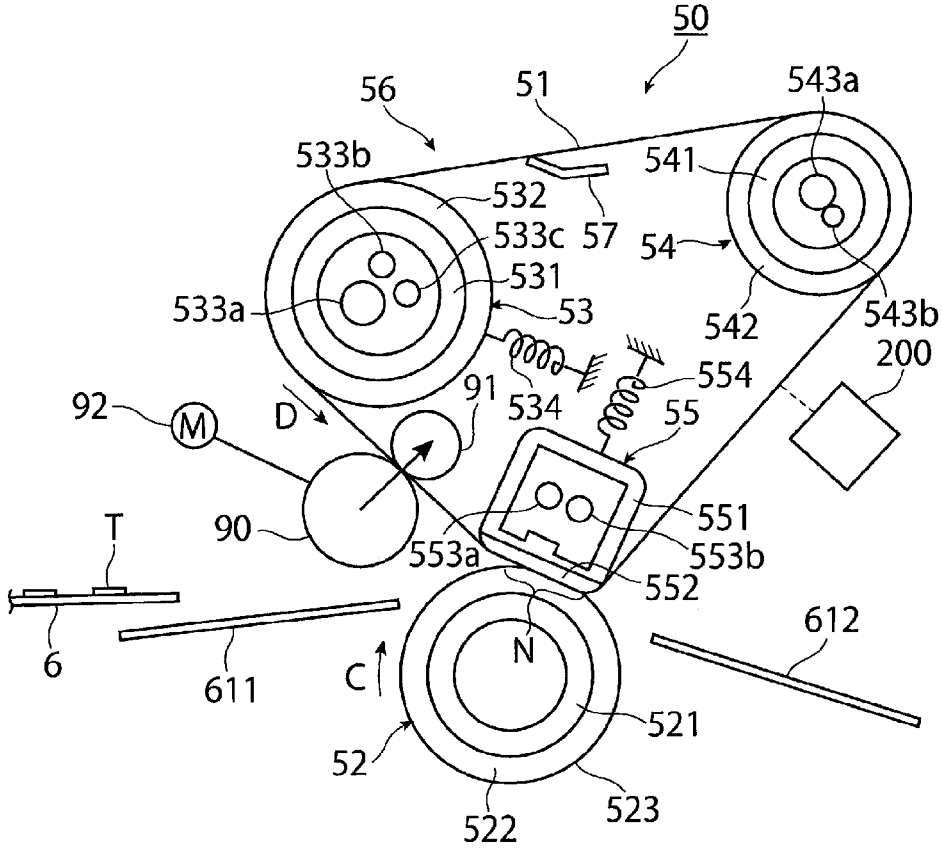
FIG. 12 is a diagram of a structure of a fixing device according to a second exemplary embodiment of the present disclosure.
Figure 13:
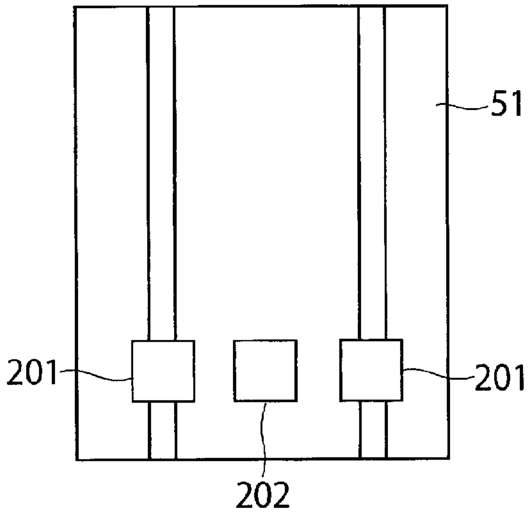
FIG. 13 is a schematic diagram of an arrangement of contactless glossmeters on the surface of the heating belt.

FIG. 12 illustrates a fixing device according to a second exemplary embodiment of the present disclosure. The fixing device according to the second exemplary embodiment includes detectors that detect the gloss of the belt surface subjected to the fixing operation, to determine a difference in the state of the surface of the belt between before the fixing operation and after the fixing operation. The changer changes the pressing load of the restorer in accordance with the detection results from the detectors.

In the second exemplary embodiment, the detectors detect the gloss of the belt surface at portions corresponding to the edge portions of the fixed recording medium in a direction crossing the direction in which the fixed recording medium is transported, and the gloss of the belt surface at a portion other than the portions corresponding to the edge portions of the fixed recording medium. The changer divides the detection results from the detectors into multiple divisions in accordance with thresholds, and changes the pressing load of the restorer in accordance with the divisions of the detection results from the detectors.

Specifically, as illustrated in FIG. 12, a fixing device 50 according to the second exemplary embodiment includes contactless glossmeters 200 at positions downstream from the fixing nip N in the movement direction of the heating belt 51. The contactless glossmeters 200 serve as detectors that detect the gloss of the surface of the heating belt 51 subjected to the fixing operation between the pressing pad 55 and the steering roller 54.

The contactless glossmeters 200 include first contactless glossmeters 201 at portions corresponding to the edge portions of the recording sheet 6 in a direction crossing the direction in which the recording sheet 6 subjected to the fixing operation is transported to detect the gloss of the belt surface, and a second contactless glossmeter 202 at a portion corresponding to a center portion of the fixed recording sheet 6 in the direction crossing the direction in which the fixed recording sheet 6 is transported other than the portions corresponding to the edge portions, to detect the gloss of the belt surface. The first contactless glossmeters 201 in the second exemplary embodiment are two first contactless glossmeters 201 located at the portions corresponding to both edge portions of the fixed recording sheet 6 in the direction crossing the direction in which the fixed recording sheet 6 is transported.

Figures 14, 15:
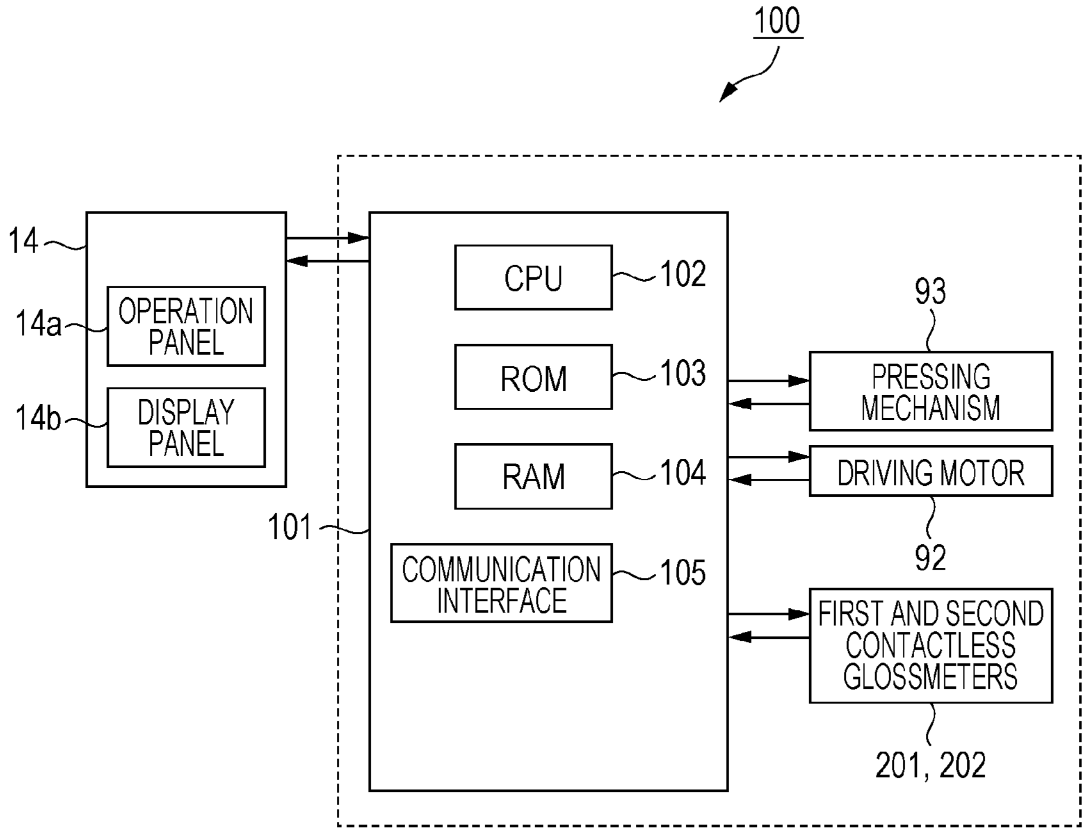
FIG. 14 is a block diagram of a controller in an image forming apparatus according to the second exemplary embodiment of the present disclosure.
FIG. 15 is a table illustrating the relationship between the gloss difference of the heating belt surface detected by contactless glossmeters and the pressing force of the refresh roller.

As illustrated in FIG. 14, detection signals from the first and second contactless glossmeters 201 and 202 are input to the control unit 101. The CPU in the control unit 101 averages the gloss on the surface of the heating belt 51 detected by the two first contactless glossmeters 201, and subtracts the averaged gloss value at the portions of the heating belt 51 corresponding to the edge portions of the recording sheet 6 detected by the two first contactless glossmeters 201 from the gloss value at the center portion of the heating belt 51 detected by the second contactless glossmeter 202 to calculate the difference.

As illustrated in FIG. 15, the ROM stores, in advance, a table illustrating the relationship between the difference between the gloss values from the first and second contactless glossmeters 201 and 202 and the pressing force of the refresh roller 90.

When the difference between the gloss values from the first and second contactless glossmeters 201 and 202 is smaller than or equal to three or a first threshold (division 1), the thrust amount (pressing force) of the refresh roller 90 is set to be relatively small. When the difference between the gloss values from the first and second contactless glossmeters 201 and 202 exceeds three or the first threshold and is smaller than or equal to nine or a second threshold (division 2), the thrust amount (pressing force) of the refresh roller 90 is set to be intermediate. When the difference between the gloss values from the first and second contactless glossmeters 201 and 202 exceeds the second threshold (division 3), the thrust amount (pressing force) of the refresh roller 90 is set to be large.

Thus, the fixing device 50 according to the second exemplary embodiment actually detects the gloss of the heating belt 51 as an example of the surface state of the heating belt 51 subjected to the fixing operation, and changes the thrust amount (pressing force) of the refresh roller 90 to enable changing of the thrust amount (pressing force) in correspondence with the actual surface state of the fixed heating belt 51.

Other components and operations are the same as those of the first exemplary embodiment, and thus are not described.

Third Exemplary Embodiment

Figures 16, 17:
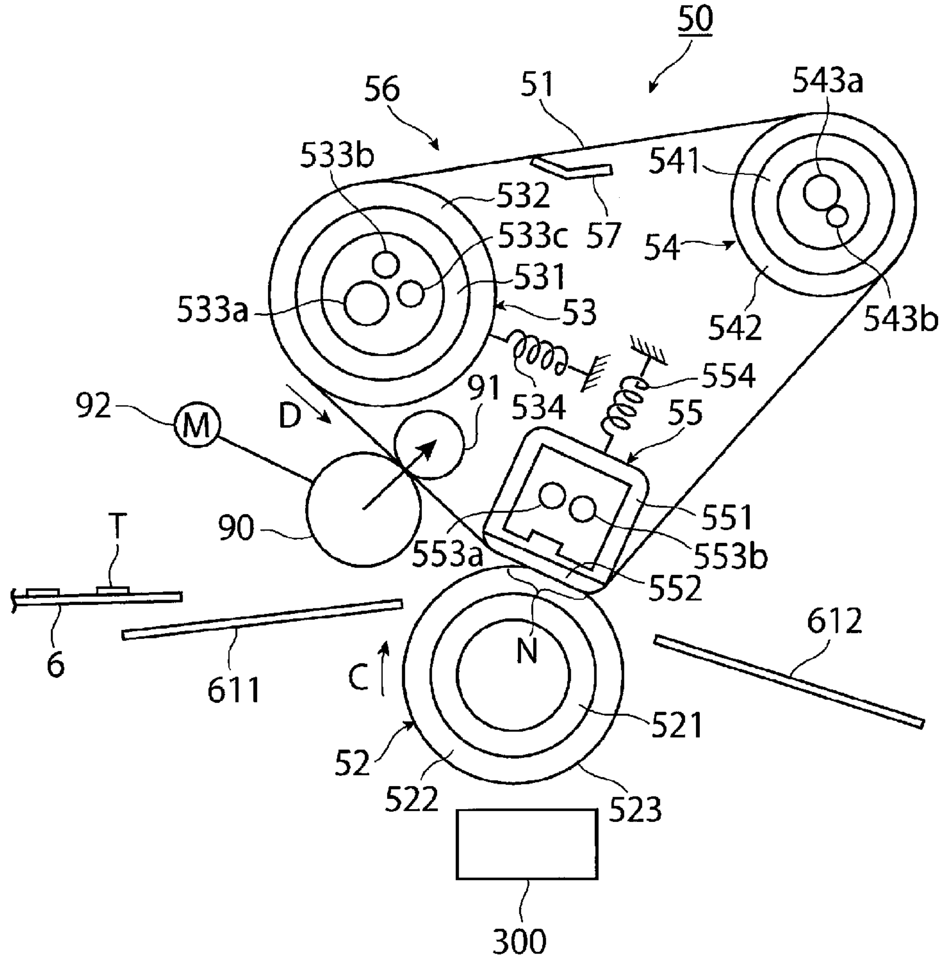
FIG. 16 is a diagram of a fixing device according to a third exemplary embodiment of the present disclosure.
FIG. 17 is a table illustrating the relationship between the fixing nip load and the pressing force of the refresh roller.

FIG. 16 illustrates a fixing device according to a third exemplary embodiment of the present disclosure. In the third exemplary embodiment, the difference in the state of the surface of the belt between before the fixing operation and after the fixing operation depends on the pressure contact state of the fixing member.

In the third exemplary embodiment, the difference in the state of the surface of the belt between before the fixing operation and after the fixing operation is determined by a nip load of the fixing member.

Specifically, as illustrated in FIG. 16, a fixing device 50 according to the third exemplary embodiment changes the fixing nip load that the pressing roller 52 exerts on the pressing pad 55 using a second pressing mechanism 300.

When the recording sheet 6 is, for example, a thin paper sheet, the second pressing mechanism 300 sets the fixing nip load to a relatively small value. When the recording sheet 6 is, for example, an ordinary paper sheet, the second pressing mechanism 300 sets the fixing nip load to a relatively intermediate value. When the recording sheet 6 is, for example, a sheet with an uneven surface such as an embossed paper sheet or cardboard, the second pressing mechanism 300 sets the fixing nip load to a relatively large value.

Thus, as illustrated in FIG. 17, the fixing device 50 according to the third exemplary embodiment changes the thrust amount (pressing force) of the refresh roller 90 in accordance with the fixing nip load of the pressing roller 52.

A belt flaw that occurs on the surface of the heating belt 51 changes in accordance with the fixing nip load of the pressing roller 52. The belt flaw increases as the fixing nip load of the pressing roller 52 increases.

Thus, by changing the thrust amount (pressing force) of the refresh roller 90 in accordance with the fixing nip load of the pressing roller 52, the fixing device 50 according to the third exemplary embodiment appropriately controls the degree to which the surface of the heating belt 51 is restored by the refresh roller 90 in accordance with the belt flaw on the surface of the heating belt 51 that changes in accordance with the fixing nip load of the pressing roller 52.

Other components and operations are the same as those of the first exemplary embodiment, and thus are not described.

Fourth Exemplary Embodiment

Figure 18:
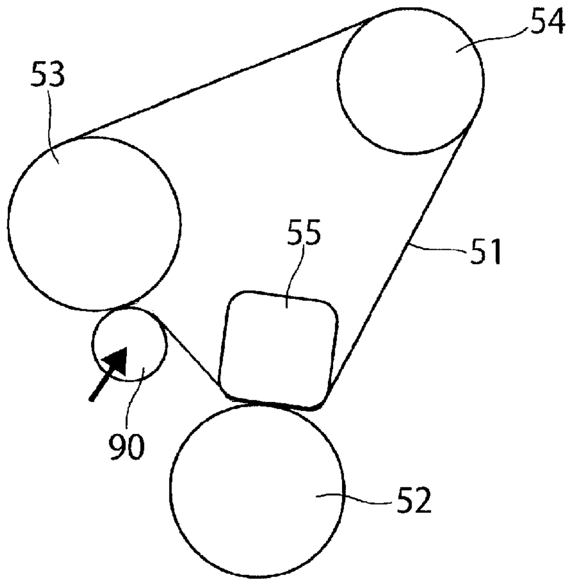
FIG. 18 is a schematic diagram of a structure of a fixing device according to a fourth exemplary embodiment of the present disclosure.
Figure 19:
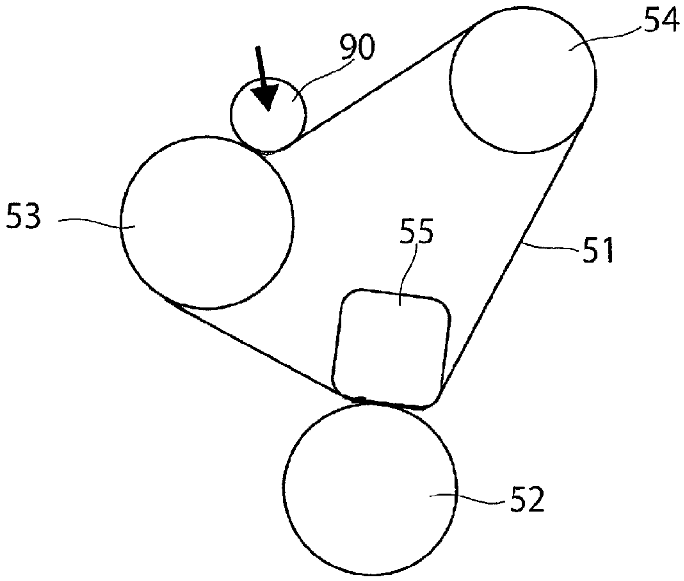
FIG. 19 is a schematic diagram of a structure of the fixing device according to the fourth exemplary embodiment of the present disclosure.

FIG. 18 and FIG. 19 illustrate a fixing device according to a fourth exemplary embodiment of the present disclosure. The fixing device according to the fourth exemplary embodiment brings the refresh roller 90 into pressure contact with the surface of the internal heating roller 53 using the pressing mechanism 93 without using the back-up roller 91, instead of bringing the refresh roller 90 serving as an example of a restorer into pressure contact with the back-up roller 91 with the heating belt 51 interposed therebetween using the pressing mechanism 93.

Specifically, as illustrated in FIG. 18 and FIG. 19, the fixing device according to the fourth exemplary embodiment brings the refresh roller 90 into pressure contact with a downstream or upstream end portion of the internal heating roller 53 in the movement direction of the heating belt 51 to bend the heating belt 51 into a substantially S shape on the surfaces of the refresh roller 90 and the internal heating roller 53.

Figure 20:
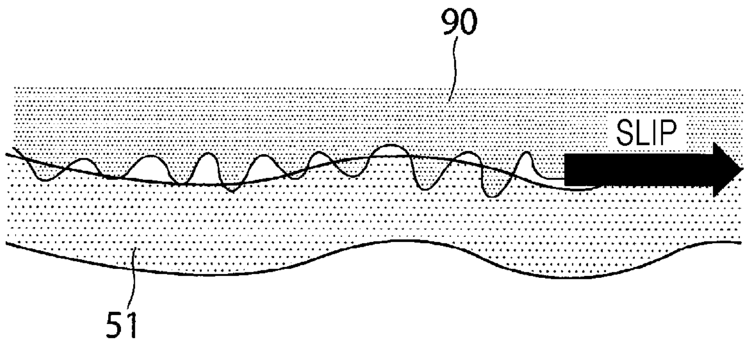
FIG. 20 is a schematic diagram of a related portion of the fixing device according to the fourth exemplary embodiment of the present disclosure.
Figure 21:
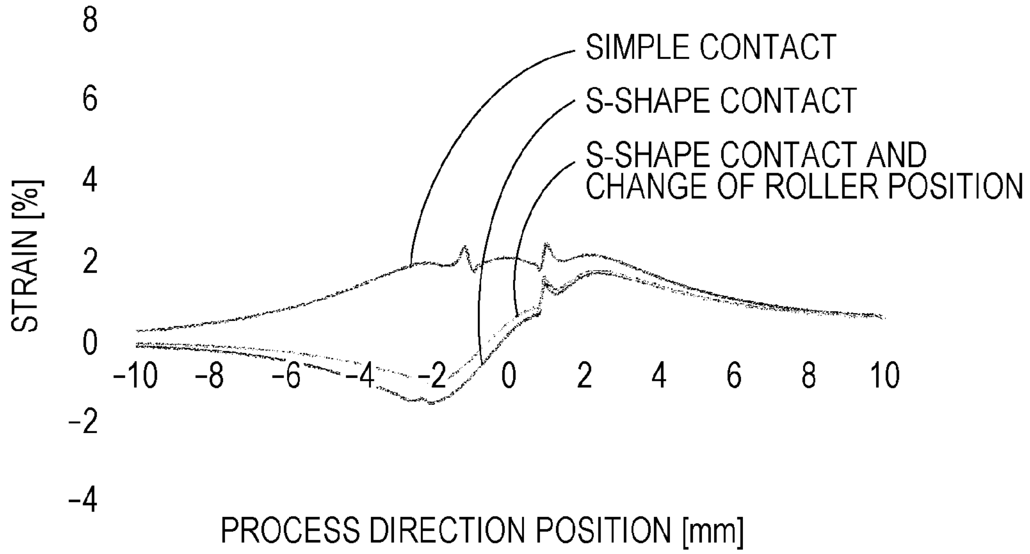
FIG. 21 is a graph illustrating a simulation of a strain of the surface of the heating belt in the fixing device according to the fourth exemplary embodiment of the present disclosure.

Thus, the fixing device according to the fourth exemplary embodiment brings the refresh roller 90 into pressure contact with a downstream or upstream end portion where the internal heating roller 53 stretches the heating belt 51 to bend the heating belt 51 into a substantially S shape, increases the amount of a slip between the surface of the heating belt 51 and the refresh roller 90 as illustrated in FIG. 20, and increases the area over which the refresh roller 90 comes into contact with the surface of the heating belt 51. FIG. 21 is a graph of a simulated strain of the surface of the heating belt in the fixing device according to the fourth exemplary embodiment of the present disclosure.

Thus, the fixing device according to the fourth exemplary embodiment improves the refreshing performance of restoring the surface of the heating belt 51 to the state before the fixing operation compared to the case where the refresh roller 90 is simply pressed against the back-up roller 91 with the heating belt 51 interposed therebetween.

Other components and operations are the same as those of the first exemplary embodiment, and thus are not described.

The exemplary embodiments have described a case where an unfixed toner image is to be fixed on a recording sheet, but this is not the only possible example. The present disclosure is naturally applicable to fixing of an object other than an unfixed toner image.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

(Appendix)

(((1)))

A fixing device comprising:

an endless belt;

a fixing member that presses the belt against a recording medium holding an unfixed image to fix the unfixed image onto the recording medium;

a restorer that is pressed against a surface of the belt after the image is fixed to restore the surface of the belt to a state before a fixing operation; and a changer that changes a pressing load of the restorer in accordance with a difference in a state of the surface of the belt between before the fixing operation and after the fixing operation.

(((2)))

The fixing device according to (((1))), wherein the difference in the state of the surface of the belt between before the fixing operation and after the fixing operation depends on a property of the recording medium.

(((3)))

The fixing device according to (((2))), wherein the difference in the state of the surface of the belt between before the fixing operation and after the fixing operation is determined based on a basis weight of the recording medium.

(((4)))

The fixing device according to (((1))), wherein the difference in the state of the surface of the belt between before the fixing operation and after the fixing operation depends on a pressure contact state of the fixing member.

(((5)))

The fixing device according to (((4))), wherein the difference in the state of the surface of the belt between before the fixing operation and after the fixing operation is determined by a nip load of the fixing member.

(((6)))

The fixing device according to (((1))), further comprising:

a detector that detects a gloss of the surface of the belt subjected to the fixing operation to determine the difference in the state of the surface of the belt between before the fixing operation and after the fixing operation, wherein the changer changes the pressing load of the restorer in accordance with a detection result from the detector.

((7)))

The fixing device according to (((6))), wherein the detector detects a gloss of the surface of the belt at a portion corresponding to an edge portion of the recording medium subjected to the fixing operation in a direction crossing a direction in which the recording medium is transported, and detects a gloss of the surface of the belt at a portion other than the portion corresponding to the edge portion of the recording medium subjected to the fixing operation, and wherein the changer divides detection results from the detector into a plurality of divisions in accordance with a threshold, and changes the pressing load of the restorer in accordance with the divisions into which the detection results from the detector are divided.

(((8)))

An image forming apparatus, comprising:

an image forming unit that forms an image on a surface of a recording medium; and a fixing unit that fixes the image formed on the surface of the recording medium, wherein the fixing device according to any one of (((1))) to (((7))) serves as the fixing unit.

What is claimed is:

1. A fixing device, comprising:

an endless belt;

a fixing member configured to press the belt against a recording medium holding an unfixed image to fix the unfixed image onto the recording medium;

a restorer configured to press against a surface of the belt after the image is fixed to restore the surface of the belt to a state before a fixing operation; and a changer configured to change a pressing load of the restorer based on a basis weight of the recording medium.

2. An image forming apparatus, comprising:

an image forming unit configured to form an image on a surface of a recording medium; and a fixing unit configured to fix the image formed on the surface of the recording medium, wherein the fixing device according to claim 1 serves as the fixing unit.

3. A fixing device, comprising:

an endless belt;

a fixing member for pressing the belt against a recording medium holding an unfixed image to fix the unfixed image onto the recording medium;

a restoring means for pressing against a surface of the belt after the image is fixed to restore the surface of the belt to a state before a fixing operation; and a changing means for changing a pressing load of the restoring means based on a basis weight of the recording medium.

* * * * *